United States Patent Office 3,000,813
Patented Sept. 19, 1961

---

3,000,813
PLATINUM REFORMING CATALYST AND
PROCESS FOR PREPARING THE SAME
Malden W. Michael, Stamford, Conn., assignor to American Cyanamid Company, New York, N.Y., a corporation of Maine
No Drawing. Filed Oct. 8, 1958, Ser. No. 765,942
4 Claims. (Cl. 208—139)

The present invention relates to platinum reforming catalysts and to the process for preparing the same. More particularly, the present invention relates to a novel process for preparing platinum-alumina reforming catalysts in which the alumina is in eta form, which catalyst has improved crush strength resistance.

Platinum catalysts, in general, are used by the petroleum industry to upgrade virgin naphthas for the production of motor fuels and for the production of aromatic hydrocarbons. A usually preferred naphtha feed is a 200–450° F. cut of Mid-Continent crude, although naphthas from other crudes, such as Texas, California, Kuwait, may be used. Mid-Continent crudes are quite plentiful and contain a large amount of naphthenes, as for example, about 40%. These naphthenes are convertible to corresponding aromatics by dehydrogenation under reforming conditions. Other reactions which normally take place in reforming are hydrocracking of paraffins, isomerization of paraffins, and dehydrocyclization of paraffins to aromatics. In a typical reforming run, a Mid-Continent crude naphtha having an unleaded octane rating of 35–40 units is converted to a motor fuel which has an octane rating of 85–100 units.

Various methods for the preparation or manufacture of platinum reforming catalysts are, in general, well-known. Thus, for example, the platinizing of alumina with chloroplatinic acid or other suitable sources of platinum is, in general, a recognized method of manufacturing platinum reforming catalysts. A widely known type of platinum reforming catalysts is one in which the alumina is prepared as alumina sol, as in accordance with U.S. Patent No. 2,258,099 or Reissue Patent No. Re. 22,196. Alumina sols prepared in this or equivalent manners, if dried and calcined, are normally converted to gamma alumina.

More recently, platinum reforming catalysts employing alumina as a base, which alumina has been derived from specially aged alumina sols, have come into modestly wide-spread usage. In general, catalysts of the latter type are characterized by a higher activity when compared with those of the former. The alumina base in the latter type catalyst may, in general, be prepared by aging alumina sols prepared, as for example, in accordance with U.S. Patent No. 2,258,099 or Reissue Patent No. Re. 22,196, with ammonia at elevated pH and temperature for significant periods of time until beta alumina trihydrate is formed. The subsequent drying and calcination of reforming catalyst pellets employing such aged alumina sol material converts the alumina to the eta form. More particularly, as illustrative of how such aged sols may be formed, reference is made herein to British Patents Nos. 787,755 and 735,390, which are incorporated herein by reference.

As has been noted hereinabove, platinum reforming catalysts employing an alumina base derived from aged alumina sol has more recently come into usage because of its improved activity characteristic. However, such a catalyst is not without limitations of its own. Thus, while found to be a highly active and effective reforming catalyst, the strength characteristics of catalyst pellets so prepared leave something to be desired. In this connection, it has been found that reforming catalysts in which the alumina base is in the eta form, lose substantial portions of their crush strength when subjected to steaming as in regeneration. This limitation has sharply restricted the commercialization of such catalysts to non-regenerative, or at best, semi-regenerative usage.

Thus, it is an object of the present invention to provide a process whereby the crush strength retention properties of platinum reforming catalysts employing eta alumina as a base may be substantially improved.

A further object of this invention is to provide such a process which is readily adaptable to conventional plant equipment and processing apparatus, and which may be accomplished with a minimum of added expense in the preparation of the platinum reforming catalyst of the type contemplated by this invention.

These and other objects and advantages of the present invention will become more apparent from the detailed description set forth hereinbelow.

In accordance with the present invention, a process is provided for preparing platinum alumina reforming catalysts having improved crush strength retentive properties, which comprises co-mingling a dry aged alumina capable of being converted upon calcination to the eta alumina form with a platinizing compound and aluminum chloride. The platinizing or platinum compound is preferably co-mingled with the dry aged alumina in such an amount as will provide from between about 0.05 and about 1% of platinum, based on the weight of the final catalyst composition, and the said aluminum chloride in such proportion as will provide from between about 0.25 and about 2.5% of aluminum chloride by weight of the final catalyst composition. Thereafter, the resulting catalyst composition is dried, the material pelleted, and the pellets calcined. Catalysts so prepared have reflected unusual and unexpectedly high crush strength retentive properties.

It is important to note that the essential characteristic of the aged alumina sol is that it be capable of conversion to eta alumina when calcined, and that for purposes of this invention, it is not of particular importance as to how such sols or gels are prepared or formed.

By "dry aged alumina," as that term is employed herein, it is meant alumina sol which has been aged, at elevated pH and temperatures, and which has been dried, as for example, for 16–18 hours at 250° F. until it is dry to the touch. Normally such material has a moisture content of less than about 40% by weight. These aged alumina sols are capable of being converted to eta alumina upon calcination, at, for example, temperatures between 900 and 1200° F.

The platinum compound employed to impregnate the dried alumina sol may be any of a number of suitable platinum compounds known to those in the art, such as for example, chlorplatinic acid, platinum tetrachloride, and their equivalents. The platinum is co-mingled with the dried aged alumina, preferably in the form of an aqueous solution or suspension of a suitable platinum compound. Normally, the platinum is employed so as to provide from between about 0.05 and about 1% of platinum, based on the dry weight of the final catalyst composition, although preferably the amount of platinum is from between about 0.1 and about 0.6%, based on said weight.

The aluminum chloride is preferably added simultaneously with the platinum compound, for ease of operation, although it will be apparent that it may be added prior to the platinum compound or subsequent thereto with drying of the catalyst material between additions. The aluminum chloride is added in such an amount as to constitute from between about 0.25 and about 2.5%, based on the weight of the final catalyst composition. Thus, in accordance with the present invention, it does not appear to be critical with respect to the time of addition of aluminum chloride, except that the addition must be to a dried aged alumina or platinized aged alumina and preferably before the formation of the catalyst composition into pellets.

The mechanism by which the present invention is accomplished is not fully understood. As indicated hereinabove, eta alumina platinum reforming catalysts of the type contemplated are subject to serious loss in crush strength when subjected to regeneration. One possible explanation for this loss in tensile strength is that the alumina, during regeneration, is recrystallized and enters a different phase. This phase conceivably could be postulated as being the change from the eta form to the theta form, during which strains are set up which weaken the pellet strength. If this be true, the presence of aluminum chloride in relatively small amounts in the catalyst composition functions in some manner, for example, as a buffer, to mitigate deterioration of crush strength of the catalyst composition.

It should be noted that while applicant postulates the above as a possible explanation for the surprising result of the present invention, he does not wish to be bound thereby.

The effect achieved by the addition of aluminum chloride is unique. Thus, other salts, as for example, aluminum phosphate, aluminum nitrate, zinc chloride, and the like, fail to produce either the desired improved crush strength retention or adversely affect activity or both. Still other metal salts, as for example, magnesium salts, and the like, are undesirable for one or more reasons, but principally because they introduce metal ions which may be catalytically different from those already present, and thus produce an adverse effect on reforming activity.

In order to illustrate the present invention more fully, the following examples are given primarily by way of illustration. No enumerations or details given therein should be construed as limitations on the present invention, except insofar as they appear in the appended claims.

EXAMPLE 1

262 grams of dry aged alumina sol powder, capable of being converted to eta alumina upon calcination, and containing 76.6% of $Al_2O_3$, was added to a solution containing 0.8 gram of platinum as $H_2PtCl_6$ (chloroplatinic acid), 2.7 grams of aluminum chloride, and 180 grams of water. The addition was accomplished with thorough mixing. The resulting mass was dried at 250° F. for 16 hours, granulated, formed into pellets employing a lubricant, and the pellets were calcined at 1100° F. to remove the lubricant and activate the catalyst.

The catalyst contained 0.4% of platinum and 1.3% of aluminum chloride based on the final weight of the catalyst composition.

EXAMPLE 2

The same procedure as was employed in Example 1 was employed here, except that the platinum-containing solution contained 4.4 grams of aluminum chloride and the final catalyst contained 2.2% of aluminum chloride.

EXAMPLE 3

The same procedure as was employed in Example 1 was employed here, except that 2 grams of $ZrOCl_2$ was employed in the platinum containing solution and the final catalyst composition contained 1% of $ZrOCl_2$.

EXAMPLE 4

The same procedure as was employed in Example 1 was employed herein, except that 10 grams of aluminum chloride was employed in the platinum-containing solution and the final catalyst composition contained 5% of aluminum chloride.

EXAMPLE 5

248 grams of dry aged alumina sol powder containing 76.6% of $Al_2O_3$ was added to a solution of 24 grams of aluminum phosphate in 188 grams of water. The mass was dried overnight at 250° F. and granulated. Platinum was added by pouring the aluminum phosphate treated powder into a solution of 0.8 gram of platinum as platinum chloride in 180 grams of water. This addition was accomplished with mixing. The mass was dried 16 hours at 250° F., formed into pellets and the pellets calcined at 1100° F.

The final catalyst contained 0.4% of platinum and 12% of aluminum phosphate.

EXAMPLE 6

The same procedure as was employed in Example 5 was employed herein, except that 20 grams of zirconium oxychloride was employed in lieu of aluminum phosphate.

The resulting catalyst contained 0.4% of platinum and 10% of zirconium oxychloride.

EXAMPLE 7

230 grams of a dry aged alumina sol capable of being converted to eta alumina upon calcination and containing 65% of $Al_2O_3$ was poured into a solution containing .8 gram of platinum as chloroplatinic acid, 0.75 gram of aluminum chloride, and 145 grams of water. The mass was dried at 250° F. for 16 hours, granulated, formed into pellets, and the pellets were calcined at 1100° F.

The catalyst composition contained 0.4% of platinum and .5% of aluminum chloride.

EXAMPLE 8

The same general procedure as was employed in Example 7 was employed here, except that 7.5 grams of aluminum phosphate was employed in lieu of the aluminum chloride.

The catalyst composition contained 0.4% of platinum and 5% of aluminum phosphate.

EXAMPLE 9

The same procedure as was employed in Example 8 was employed here, except that 0.75 gram of aluminum phosphate was utilized.

The final catalyst composition contained .5% of aluminum phosphate and 0.4% of platinum.

EXAMPLE 10

230 grams of dry aged alumina sol powder containing 65% of $Al_2O_3$ was poured into a solution of 7.5 grams of aluminum phosphate in 140 grams of water. After drying the mixture for 16 hours at 250° F., the material was poured into a solution of .8 gram of platinum as chloroplatinic acid in 140 grams of water. This mass was dried at 16 hours at 250° F., formed into pellets, and the pellets calcined at 1100° F.

The catalyst contained 0.4% of platinum and 5% of aluminum phosphate.

EXAMPLE 11

The same procedure as was employed in Example 10 was employed herein, except that 7.5 grams of aluminum nitrate was employed instead of aluminum phosphate.

The catalyst contained 0.4% of platinum and 5% of aluminum nitrate.

EXAMPLE 12

230 grams of dry alumina sol powder containing 65% of $Al_2O_3$ was poured into a solution of .8 gram of platinum as chloroplatinic acid in 445 grams of water. The addition took place with mixing. After drying for 16 hours at 250° F., the material was formed into pellets, the pellets calcined at 1100° F.

The catalyst contained 0.4% of platinum.

The activity and crush strength, as well as the crush strength retentive properties of the catalyst prepared in Examples 1–12 were evaluated and the results thereof reported in Table I hereinbelow.

The activity values reported therein were determined in accordance with a hydroforming or reforming test under standardized conditions, employing 50 milliliters of catalyst in a quasi-isothermal reaction zone surrounded by an electrically heated block for temperature control. The tests were carried out at a catalyst outlet temperature of 920° F. (493° C.), a pressure of 200 pounds per square inch gauge, an hourly weight space velocity of 2, and a once-through hydrogen rate of 5,000 standard cubic feet per barrel of feed. The feed was a Mid-Continent virgin naphtha having an ASTM distillation range of 210 to 356° F. (99 to 170° C.), a CFR–R octane number of 44.0, an API gravity of 55.2°, a Reid vapour pressure of 1.1 pounds per square inch, and a composition consisting of 50.0 percent by volume of paraffins, a trace of olefins, 41.5 percent naphthenes, 8.5 percent aromatics, 0.028 percent sulfur, and 0.01 percent nitrogen (Kjeldahl). The catalyst activity was calculated as the relative quantity, expressed as a percentage, of an arbitrarily chosen standard catalyst required to produce $C_5+$ product fraction having the same octane number under the test conditions.

The initial crush strength values or the crush strength values of the freshly prepared catalysts were determined in accordance with prior art procedure in which the pellet is laid on its side on a platform scale and pressure applied at an even rate until the pellet is crushed. The weight applied at this crushing is recorded as the crush strength, and the average of 20 pills is considered the average crush strength. The crush strength values after steaming for 5 hours at 1300° F. were determined by the same procedure. Steaming for 5 hours at 1300° F. constitutes an accelerated test simulating frequent regeneration. This test which involves passing steam over the pellets at 1300° F. for 5 hours, was employed with respect to the catalyst prepared in Examples 1 and 5–12. A second and more severe accelerated test simulating frequent regeneration was employed with respect to the catalyst prepared in Examples 2–4 and 13. This test involves the passing of steam up through the pellets at 750° C. for 5 hours.

*Table I*

| Example | Percent of Additive | Activity | Fresh | Steamed | Percent Strength Retained |
|---|---|---|---|---|---|
| 1 | 1.3% $AlCl_3$ | 225 | | | 92 |
| 2 | 2.2% $AlCl_3$ | 183 | 6.3 | 2.2 | 35 |
| 3 | 1% $ZrOCl_2$ | 166 | 6.6 | 1.4 | 21 |
| 4 | 5% $AlCl_3$ | 120 | 6.4 | 2.3 | 36 |
| 5 | 12% $AlPO_4$ | 72 | | | 94 |
| 6 | $ZrOCl_2$ (10%) | 181 | | | 71 |
| 7 | .5% $AlCl_3$ | | 9.2 | 7.8 | 84 |
| 8 | 5% $AlPO_4$ | | 8.5 | 5.5 | 65 |
| 9 | .5% $AlPO_4$ | 103 | 8.8 | 7.5 | 96 |
| 10 | 5% $AlPO_4$ | | 10.3 | 8.2 | 80 |
| 11 | 5% $Al(NO_3)_3$ | | 14.9 | 7.6 | 51 |
| 12 | No additive | 125 | 8.0 | 3.8 | 48 |
| 13 | No additive | 125 | 6.0 | <1.0 | 15 |

An analysis of Table I hereinabove indicates that of all the possible and plausible variations with respect to metal salts, amounts of addition, and the like, that only aluminum chloride employed within the range prescribed by the present invention results in a catalyst material which is characterized by both good crush strength retention and a high level of activity.

EXAMPLE 13

The same procedure as was employed in Example 12 was employed herein to provide a control for the more severe simulated regeneration test referred to above.

EXAMPLE 14

A standard platinum aluminum reforming catalyst is prepared by impregnating an alumina sol in which the alumina is in such form as to be converted to gamma alumina by calcination. This catalyst contains 0.4% platinum based on the weight of the catalyst. Subjecting the catalyst to the accelerated regeneration test outlined above, does not seriously affect its crush strength.

It will be apparent to those skilled in the art that additional components may be incorporated into the catalyst of the present invention, such as fluorine, chlorine, and the like, or other materials, as promoters and activating agents in the usual proportions, as for example, between about 0.1 and about 10%, based on the dry weight of the catalyst composition.

I claim:

1. A process for preparing a platinum-alumina reforming catalyst having improved crush strength retentive properties, which comprises co-mingling dried aged alumina, capable of being converted to eta alumina upon calcination with a platinum compound and aluminum chloride, said platinum compound being co-mingled in a proportion to provide from between about 0.05 and 1% of platinum based on the dry weight of the catalyst, and said aluminum chloride being co-mingled so as to provide from between about 0.25 and about 2.5% of aluminum chloride on the dry weight of the catalyst, drying the resulting catalyst mixture, forming the same into pellets, and calcining the pellets.

2. A process according to claim 1, wherein the amount of platinum is sufficient to provide from between 0.1 and 0.6% based on the dry weight of the catalyst composition.

3. A platinum-alumina reforming catalyst having improved crush strength retention properties and containing from between 0.05 and 1% of platinum and from between about 0.25 and about 2.5% of aluminum chloride on the dry weight of the catalyst, said catalyst being prepared by impregnating dry aged alumina capable of being converted to eta alumina upon calcination with a platinum containing compound and aluminum chloride and thereafter pelleting the catalyst mixture and calcining the pellets.

4. A process for reforming petroleum hydrocarbons under reforming conditions with a platinum-alumina catalyst characterized by improved crush strength retention properties and containing from between 0.05 and 1% of platinum and from between about 0.25 and about 2.5% of aluminum chloride on the dry weight of the catalyst, said catalyst being prepared by impregnating a dry aged alumina capable of being converted to eta alumina upon calcination with a platinum containing compound and aluminum chloride and thereafter pelletizing the resulting mixture and calcining the pellets.

References Cited in the file of this patent

UNITED STATES PATENTS

| | | |
|---|---|---|
| 2,277,512 | Simo et al. | Mar. 24, 1942 |
| 2,746,937 | Hunter et al. | May 22, 1956 |
| 2,840,527 | Brennan et al. | June 24, 1958 |